United States Patent [19]

Jaeger

[11] 4,359,757
[45] Nov. 16, 1982

[54] METHOD FOR THE OPTO-ELECTRONIC TRANSMISSION OF AN IMAGE ORIGINAL

[75] Inventor: Walter Jaeger, Cureglia, Switzerland

[73] Assignee: GX-Holding AG., Basel, Switzerland

[21] Appl. No.: 210,215

[22] Filed: Nov. 25, 1980

Related U.S. Application Data

[63] Continuation-in-part of Ser. No. 71,074, Aug. 30, 1979, Pat. No. 4,301,467.

[30] Foreign Application Priority Data

Nov. 29, 1979 [CH] Switzerland .................. 10615/79

[51] Int. Cl.³ ............................................. H04N 9/04
[52] U.S. Cl. ........................................ 358/49; 358/44
[58] Field of Search ................. 358/41, 44, 49, 55, 358/66

[56] References Cited

U.S. PATENT DOCUMENTS

| | | | |
|---|---|---|---|
| 2,465,652 | 3/1949 | Legler | 358/49 |
| 2,552,464 | 5/1951 | Siezen | 358/66 |
| 2,600,590 | 6/1952 | Thomas | 358/55 |
| 3,591,706 | 7/1971 | Parker-Smith | 358/49 |
| 3,668,304 | 6/1972 | Eilenberger | 358/49 |
| 3,787,614 | 1/1974 | Waldspurger | 358/49 |
| 4,301,467 | 11/1981 | Iaeger | 358/49 |

*Primary Examiner*—Michael A. Masinick
*Attorney, Agent, or Firm*—Eric P. Schellin

[57] ABSTRACT

An axially symmetrical image is interrogated by means of a Z-shaped scanning raster to permit a simple color picture recording, which however contains all subjectively necessary elements. A scan of each of the two symmetrical images with a quadrupled interlace raster is produced. Video signals are repeated prior to image reproduction in order to avoid line creep. Repetition of one and the same video recording can be performed line by line, for example for video films intended for domestic use, and can be performed frame by frame for studio reproduction.

8 Claims, 13 Drawing Figures

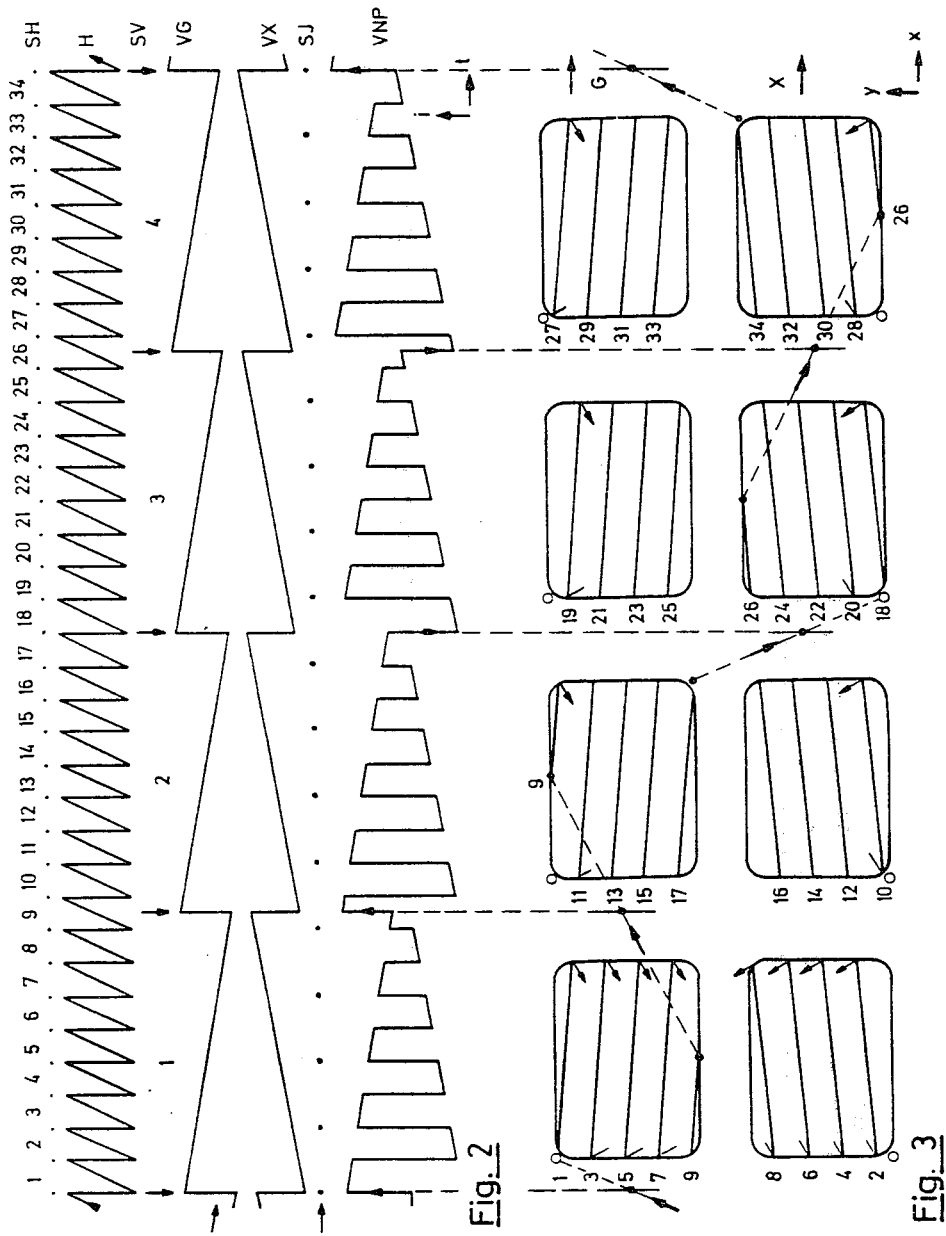

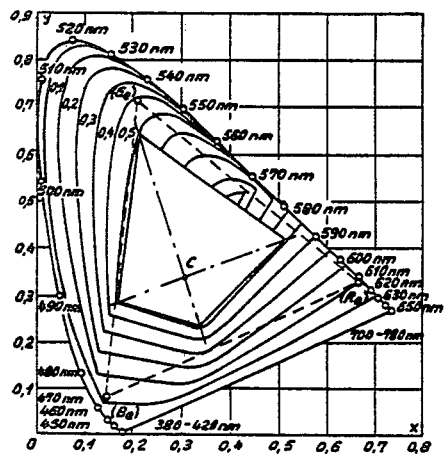
Fig. 7
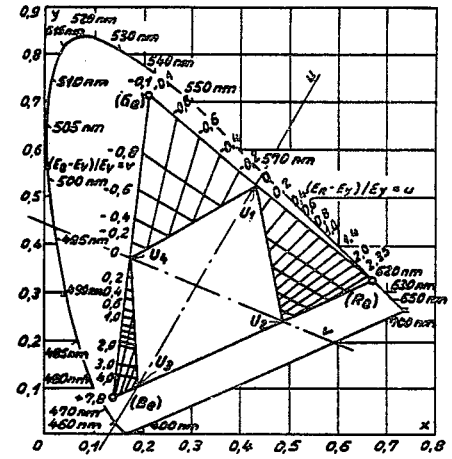
Fig. 8
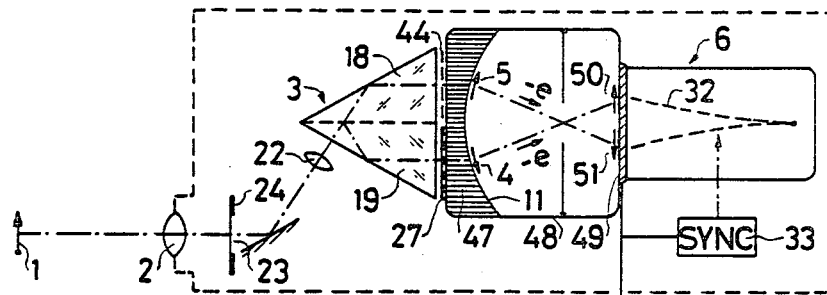
Fig. 9
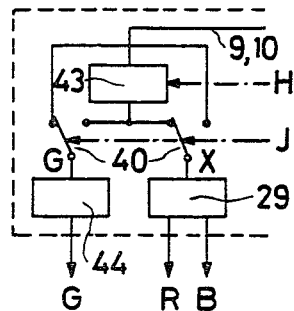
Fig. 10
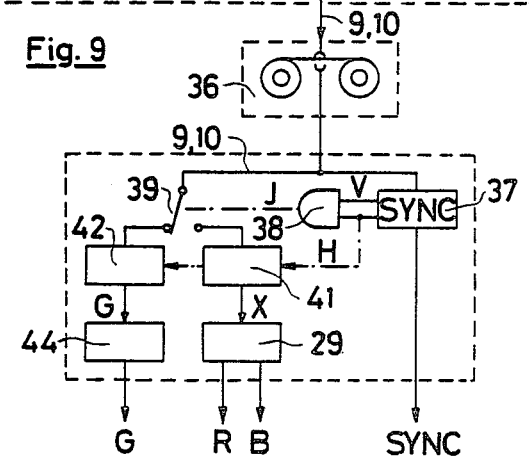

METHOD FOR THE OPTO-ELECTRONIC TRANSMISSION OF AN IMAGE ORIGINAL

BACKGROUND OF THE INVENTION

This application is a continuation-in-part of my prior copending application, Ser. No. 71,074, filed Aug. 30, 1979, now U.S. Pat. No. 4,301,467, issued Nov. 17, 1981, relating to the opto-electronic transmission of an image original which radiates in at least two wave-length ranges and/or distributions which differ from each other. The image original is simultaneously formed by means of a lens and by an optical image splitter in the form of two adjacent images on the photosensitive coating of a single or two separate photo-electric transducers and the two images are directly or indirectly converted into two electric video signals by raster scanning of the photo-sensitive coating of the photo-electric transducer or transducers.

It is known to televise polychrome image originals by forming the image optically, for example three times adjacently, on one and the same photo-sensitive coating of a camera tube and by scanning these images in raster configuration by means of an electron beam. The images will be situated in uniform alignment in a block like postage stamps.

Identical points in the image will be situated asymmetrically with respect to the longitudinal axis of the optical elements and with respect to the geometrical centre axis of the camera tube. Some elements generate symmetrical shading and geometrical distortions. The camera tube is subject to substantial geometrical distortion and changes of sensitivity, both of which act symmetrically with respect to the camera axis. To reproduce the image, the three images must be brought into flush alignment and each image point must be reproduced at the correct ratio of its intensity. This calls for comprehensive optical and/or electronic means for correcting the geometry and shading.

SUMMARY OF THE INVENTION

It is the object of the present invention to provide a method, capable of functioning without the correcting means which require exceptionally difficult adjustment and readjustment and permitting the use of camera tubes with substantial geometrical distortion, for example image amplifier tubes.

The method according to the invention is associated with the generation of two images situated adjacently and symmetrically with respect to each other on a surface which is at least approximately plane and by said images having a brightness distribution between them which is symmetrical for a monochrome image original and such images are interrogated so that the scanning rasters are also situated at least approximately symmetrically with respect to each other.

To achieve transmission compatible with broadcasting in accordance with the present invention it is advantageous to use two scanning rasters which repeat after two vertical scanning strokes and produce an interlace scan of at least one of the two images.

To achieve sharply focused transmission it is advantageous to employ two scanning rasters, which repeat after four vertical scanning strokes and each comprises four quarter rasters which nest within each other and are locally offset from each other by a quarter line.

To obtain the simplest possible optical and scanning systems it is advantageous for the two images to be generated on the photo-sensitive coating of a camera tube and to be scanned directly or indirectly by means of an electron beam.

For reasons of compatibility with conventional television systems two images are generated in flush aligned mirror image configuration on the photo-sensitive coating.

To obtain two images which are symmetrical with respect to the longitudinal axis of the camera tube the images are generated on the photo-sensitive coating are interrogated so that the scanning rasters are disposed symmetrically and more particularly in mirror image configuration with respect to each other and that in the case of frame and line scanning the latter takes place after two half field rasters, which are offset by a half line with respect to each other and are nested within each other. To this end it is advantageous to generate the two images by means of a frame splitter with a geometric-optically homogenous, partially transmissive, reflective plane which passes each incident pencil of rays partially without deflection and partially reflects it and by the use of two planes each of which performs reflective deflection and one of the planes is disposed upstream and the other downstream of the partially transmissive, reflective plane so that the line of intersection between the two deflecting planes is situated in the partially transmissive plane and their angles of inclination ($\alpha$) are of equal magnitude with respect to the latter.

It is also convenient to employ an image splitter with two optical 30°/60°/90° prisms, fixedly interconnected by means of a partially transmissive stratum.

The method according to the invention operates with only two images. However, three colour separations are necessary to provide correct colour reproduction. This can be achieved by means of a lens for generating an intermediate image which is projected by an intermediate optical system and by the adjoining image splitter on the photo-sensitive coating and image limitation is advantageously performed in the intermediate image plane.

To this end it is advantageous that at least one image is produced by striated filtration on the photo-sensitive coating by means of at least one striation filter which filters two different wave lengths ranges and/or distributions and the optically encoded electric video signals, produced by direct or indirect scanning, are distributed in accordance with the coding by electric decoding means.

To achieve the simplest possible signal transmission it is convenient that a striation filter be disposed in the intermediate image plane and a uniformly filtering filter be disposed in one optical path between the image splitter and the photo-sensitive coating or two uniformly filtering filters which are different from each other are disposed in both optical paths and the filter colour is selected so that electric video signals, whose coding components correspond to at least three different colour separations, are generated after scanning of the photo-sensitive coating. To avoid flickering images it is convenient for the images to be interrogated in time sequence by means of a switching mechanism and that at each instant only one of the electrical video signals is transmitted.

Since the image generated from the intermediate memory usually has unsharp edges it is convenient to generate, by means of a lens, an intermediate image which is projected on the photo-sensitive coating by an ing image splitter and by means of the adjoining image splitter and image limitation advantageously takes place in the intermediate image plane. To obtain optimum geometrical area utilization of the photo-sensitive coating two images are generated with an axis of symmetry parallel with the line direction and the individual signals are stored, corresponding to a half field scan, in the intermediate memory, at least for the duration of a half field period.

When using an interlace scan it is advantageous to employ an identification signal to coordinate the electric video signals to each scanned colour separation and to form the identification signal from the horizontal and vertical synchronizing signals by means of a coincidence circuit.

BRIEF DESCRIPTION OF THE DRAWING

The invention will be explained by reference to the accompanying drawing in which.

DETAILED DESCRIPTION OF

FIG. 2 shows the horizontal scans H formed from the horizontal synchronizing pulses SH.

Two symmetrically disposed vertical scans VG and VX are formed from the vertical (frame) synchronizing pulses SV.

Identification synchronization SJ alternately renders one of the above-mentioned vertical scans operative to provide a vertical deflection VNP.

FIG. 3 shows the line trace produced by the scanning described with reference to FIG. 2 for reproduction of the G and X image. It can be seen that both images are reproduced with a quadrupled interlace scan. The images therefore contain all video data but provide the impression of drifting lines unless line repetition is employed.

Figure 4A:

FIG. 4a shows the reproduction of a rhombus without repetition of any data. Owing to the persistence of human vision this provides the impression of a raster which drifts at the velocity v.

Figure 4B:

FIG. 4b shows the reproduction of the same rhombus but each line is repeatedly reproduced on a line by line basis in order to avoid drifting lines. It can be seen that the edge sharpness of image reproduction suffers substantially.

Figure 4C:

FIG. 4c is a reproduction of the same rhombus with line repetition in half field configuration. It can be seen that the image reproduction is substantially improved compared with that of FIG. 4b.

Figure 4D:

FIG. 4d shows an image reproduction in which data is repeated frame by frame. It can be seen that image reproduction sharpness becomes perfect and surprisingly the image does not flicker.

Figure 5:
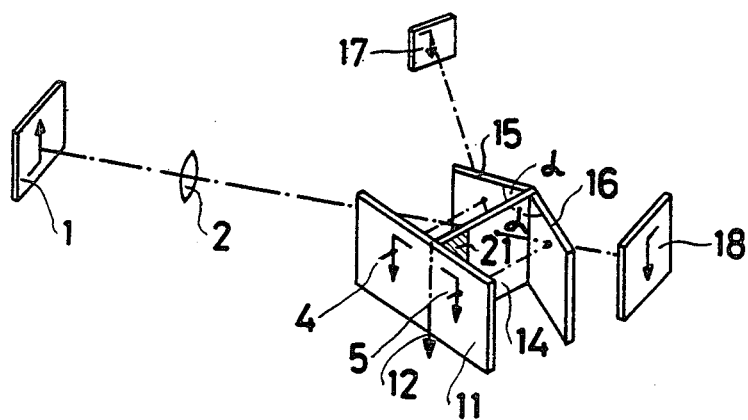

FIG. 5 is an exemplified embodiment of a symmetrical image splitter and shows its method of operation. The lens 2 projects the object 1 (without image splitter) in inverted form on the image plane 18. The image splitter contains a partially transmissive and a partially reflective plane 14. In the absence of the mirror said plane projects the object

hand between the planes on which the images 4 and 5 are generated.

The coded video signals 9 and 10 are produced when the images 4 and 5 are scanned by the electron beam 32 in the camera tube 46. The two raster filters 27 and 28 generate striated images in which the striae correspond to two different colour separations because of the locally different transmissivity of the raster filters 27,28. Scanning by means of the electron beam 32 produces a video signal which contains the image information of polychrome colour separations is frequency multiplex-nested form. The electron beam 32 is moved by the deflection signals from the synchronizing centre 33 over the striated polychrome images. Said beam thus generates the video signals 9 and 10, each of which corresponds in frequency multiplex to two colour separations. The frequency selective system 29 splits each of the frequency multiplex signals 9 and 10 into its components. Each of these components is connected by the switches 30 and 31 to the four inputs $U_1^*$, $U_2^*$, $U_3^*$ and $U_4^*$ of the matrix 35 in accordance with the scanning of images 4 and 5. The matrix 35 therefore generates the video signals R,G and B which at each instant correspond to the colour separation that has just been scanned.

To ensure flicker-free reproduction of monochrome places of the original image each of two images, filtered in such striated manner, are projected on the photo-sensitive coating of the camera tube 46 so that each of the two decoded electric video signals corresponds to a pair of complementary colours.

To ensure that polychrome parts of the original image, i.e. of the object 1, are also reproduced with the least amount of flicker, the system employs striation filters which are such that all complementary colours are situated on the same curve with a constant, relative brightness reference value for body colours with optimum colours and their studio light illumination, as can be seen by reference to FIG. 7.

To provide the best subjective colour reproduction striation filters are used as illustrated in FIG. 8, with filter coefficients which correspond at least approximately to the primary colours $U_1$, $U_2$, $U_3$ and $U_4$ of human vision and correspond substantially to the points of intersection of the small u axis and v axis of television with the colour triangle $(R_e)$, $(G_e)$, $(B_e)$ used in television. The u and v axes are defined by $$u=(E_R-E_y)/E_y \text{ and } v=(E_B-E_y)/E_y$$

and $E_y=0.3 \cdot E_R+0.59 \cdot E_G+0.11 \cdot E_B$.

Figure 6:
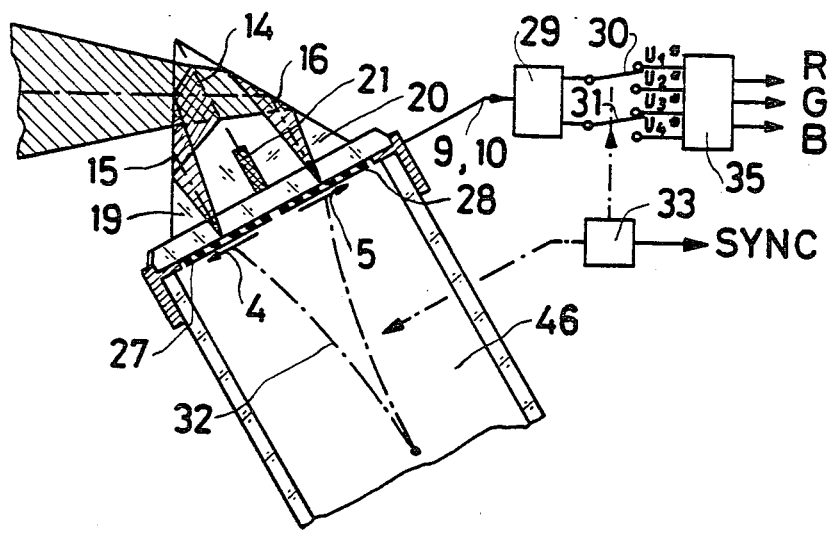

The striation filters 27 and 28 of FIG. 6 or 9 must be disposed close to the image plane. It is however also possible to place a two-coloured striation filter into the intermediate image plane 23 and to dispose two differently coloured, optically homogeneous light filters between the prisms 18 and 19 and the image planes in which the image 4 and 5 is produced.

Substantial geometric distortion, provided it occurs only symmetrically, can be tolerated, because of the symmetrical arrangement of the images 4 and 5 and by virtue of the image scanning by the electron beam 32.

In practice it was hitherto impossible to employ video amplifier tubes for colour reproduction because of their severe geometrical distortion. As indicated in FIG. 9, they can be used because of the symmetry properties of the present method. The video amplifier 48 amplifies the images 4 and 5 generated by the fibre glass optics 47 on the photosensitive coating 11. The images 50 and 51, which can then be scanned in time sequence by the electron beam 32, and are still disposed symmetrically with respect to the tube axis, are thus generated on the intermediate stratum 49.

FIGS. 9 and 10 indicate storage of the video signals 9 and 10 by the memory devices 41 and 42 and 43 respectively, to avoid flicker effects.

Figure 1:
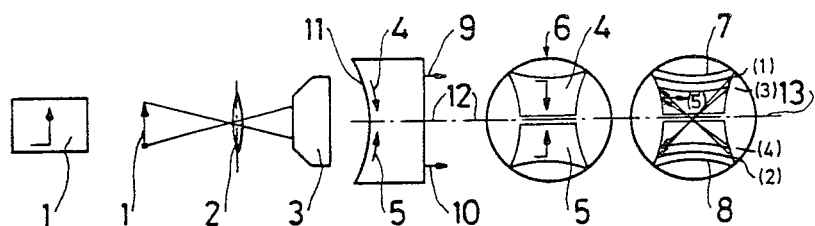
FIG. 1 shows in diagrammatic form an exemplified embodiment of a system for performing the method according to the invention, FIG. 2 the scanning rasters employed for interrogating the double image, FIG. 3 the reproduction rasters employed for image reproduction, FIGS. 4a through 4d the production of a rhombus by different decoding means, FIG. 5 a perspective view of an exemplified embodiment of an image splitter, FIG. 6 a section through a second exemplified embodiment of an image splitter arranged on a camera tube block circuit diagram of the connected signal using system, FIGS. 7 and 8 exemplified filter coefficients, FIG. 9 a diagrammatic view of the use of the method according to the invention using a head amplifier tube FIG. 10 a modification of one detail of the schematic FIG. 9.

It is also possible to generate two images as shown in FIG. 1 and to store the video signals, corresponding to one raster line, for the duration of a line period in an intermediate memory.

It is also possible to generate two images as illustrated in FIG. 1 and to store the video signals, corresponding to one half field scan, in an intermediate memory, at least for the duration of one half field.

Memory systems have a limited resolution. Image reproduction therefore appears to be less sharp. This can be improved by the insertion of a crispening circuit 44 upstream of the green signal output.

In addition to the memories 41, 42 or 43, image repetition calls for a switching mechanism 39 or 40. Switching must be performed in synchronism and in phase with the scanning of images 50, 51. According to FIG. 9, a coincidence system 38 is provided to obtain synchronous switching in phase. In conjunction with interlace scanning this permits unequivocal coordination of the synchronizing signal J from the coincidence of the horizontal and vertical synchronizing signals H and V. The last-mentioned are obtained by the synchronizing separator 37 from the video signals 9 and 10 respectively.

Owing to unavoidable band jitter, a video signal obtained from a program memory 36 no longer has a precise time axis. The memory time is altered by the horizontal pulse H and the stored video signal is called up from the memory so that it coincides precisely in time with the direct video signal, so that the video signals stored in the intermediate memories 41, 42 and 43 respectively nevertheless generate an image which coincides with the directly generated image reproductions.

Since a relatively small frequency band is required during transmission of the optical encoded video data (image 4 in FIG. 9), if this corresponds only to a red and a blue colour separation, then during transmission of, for example, green video data (image 5 in FIG. 9) it is possible for additional data, more particularly several speech data, to be co-transmitted during the transmission time of the first image 4. This is due to the fact that only a third of the band width required for transmission of green data is required for transmitting red data and only an eighth of the band width required for the transmission of green data is sufficient for the transmission of blue data. An auxiliary carrier, higher than the highest red data to be transmitted, can therefore be amplitude modulated with blue data and can be transmitted together with red data. The band width of this combined signal is only slightly wider than half the band width of the green signal.

Similar conditions obtain for digital transmission.

What I claim:

1. In a system for optoelectronic transmission of an image original (1) radiated in at least two beams having wave-length distributions which differ from each other by being simultaneously projected through a lens (2) and an optical image splitter (3) to form two adjacent images (4,5) on a photosensitive coating surface (11) of photoelectric transducer means (6), the method of converting the two images (4,5) into two electric video signals (9,10) by raster scanning of the photosensitive coating surface (11) of the photoelectric transducer means (6), including the steps of: generating the two images (4,5) adjacently disposed in surface aligned, mirror image configuration on said surface (11) in axial symmetry with respect to each other and with respect to a line scanning direction (13) establishing brightness distributions for the two images that are symmetrical for a monochrome version of the image original (1); scanning the two images along two scanning rasters (7,8) positioned in approximately axially symmetrical configuration with respect to each other and with respect to the line scanning direction (13); and interlinking said scanning rasters with each other line by line with respect to time.

2. The method according to claim 1, wherein said scanning is repeated after two vertical scanning strokes to produce an interlace color separation scan of at least one of the two images (4,5).

3. The method according to claim 2 including the steps of: generating horizontal and vertical synchronizing signals (H,V) corresponding to said scanning; and forming a color identification signal (J) therefrom to coordinate the electric video signals to each of the color separation scans.

4. The method according to claim 1, wherein said scanning is repeated after four vertical scanning strokes to form four quarter raster scans interlinked with each other and locally offset from each other by a quarter line.

5. The method according to claim 4 including the step of generating after each second line of said scans an identification signal (J) to coordinate the electric video signals (9,10).

6. In an opto-electronic image transmission system having an image surface intersected by a symmetry axis between two mirror images projected thereon by optical splitting of an original image from which video signals are generated for remote image reproduction, the method of enhancing said image reproduction including the steps of: scanning the two mirror images on said surface along scanning rasters in substantially symmetrical relation to each other relative to said symmetry axis to produce interlaced color separation scans of the original image; and repeating said scanning with respect to at least one of the two mirror images in out-of-phase relation to form at least one of the interlaced color separation scans.

7. The method of claim 6 wherein said step of repeated scanning is performed after two vertical scanning strokes.

8. The method of claim 6 wherein said step of repeated scanning is performed after four vertical scanning strokes with respect to both of the two mirror images to form four interlaced scans per image frame.

* * * * *